United States Patent Office 3,414,533
Patented Dec. 3, 1968

3,414,533
MOLDING MATERIALS BASED ON BITUMEN
AND ETHYLENE COPOLYMERS
Hans-Georg Trieschmann, Hambach, Weinstrasse, and
Leo Unterstenhoefer, Limburgerhof, Pfalz, Germany,
assignors to Badische Anilin- & Soda-Fabrik Aktiengesellschaft, Ludwigshafen (Rhine), Germany
No Drawing. Filed Apr. 8, 1966, Ser. No. 541,118
Claims priority, application Germany, Apr. 14, 1965,
B 81,449
6 Claims. (Cl. 260—28.5)

This invention relates to a molding material containing bitumen, a copolymer of ethylene and a vinyl ester and/or an acrylic and/or methacrylic ester, and polyisobutylene.

It is known that polyolefins, such as polyethylene and polyisobutylene, may be mixed with bitumen in any proportions. These molding materials, which have a considerably higher stability under load than pure bitumen, even when only a small amount of polyethylene has been added, are used as cable sealing compound or in the insulation of electrical contacts. The adhesion and elongation of these molding materials of bitumen and polyethylene however leave much to be desired. In the case of molding materials of bitumen and polyisobutylene, the adhesion is satisfactory, but not their stability under load because they have a tendency to cold flow. Resistance to ageing is unsatisfactory in both cases, separation of the mixture into its components takes place and oily constituents of the bitumen readily exude.

Furthermore it is known from Belgian patent specification No. 642,091 that molding materials based on bitumen and ethylene copolymers may be prepared in any proportions. If the amount of ethylene copolymer is more than 20% by weight, thermoplastic substances are obtained having excellent mechanical properties. For these prior art molding materials it is advantageous to use a bitumen having a penetration of 10 to 210. The copolymers of ethylene may be those with vinyl esters and/or copolymerisable acrylic and/or methacrylic compounds.

French patent specification No. 1,353,416 and British patent specification No. 969,169 describe molding materials of bitumen and copolymers of ethylene and vinyl acetate. Molding materials of bitumen and ethylene copolymers which contain appreciably less than 20% by weight of the copolymers have an increased softening point, but their breaking point is at too high a temperature for many purposes. Moreover the stability of the dispersion of the components in each other and also the resistance to ageing of the molding materials leaves much to be desired. This is disadvantageous after only relatively short periods in the case of strongly stressed thin films, sheeting or coatings lying in the open air. Ageing of molding materials based on bitumen and ethylene copolymers is caused primarily by evaporation of the volatile oil constituents of the bitumen and by resinification of its aromatic constituents. These changes in the constituents of the bitumen may lead to separation of the molding materials into their components and to embrittlement of the molding materials.

A number of tests are available for testing ageing. For example a sample of the molding material may be held in a penetration vessel for five hours at 200° C., the change in the penetration being determined after cooling. In a similar test, thin sheeting about 1 mm. in thickness is subjected to a prolonged heat treatment at 70° to 120° C. and the change in tensile strength and elongation at break measured. These are a good measure of the resistance to ageing of the sample. Separation of the components in the thermal test may also be observed in a diminution in the adhesion. In the "Thin-Film test" (ASTM D6), the cooled layer may usually be taken out from the penetration vessel in friable condition. The surface also often exhibits an oily grease coating. In the case of unchanged homogeneity, the surface of the samples remains glossy and the samples adhere to their support after the test. Separation phenomena may also be detected with a microscope. A sample which is resistant to ageing has a uniform appearance before and after the thermal treatment, i.e. particles of plastic and particles of bitumen are uniformly distributed.

Artificial weathering is another test for resistance to ageing. In this a layer of the molding material having a thickness of 1 mm. is applied to the surface of a steel plate which has been sandblasted, and then exposed to weathering cycles in a weatherometer or Gardnet appliance. Grain formation, discoloration, flouring and/or exudation of oils appears on the surface of samples which are not resistant to ageing.

Exudation of low molecular weight constituents may also be detected by means of the filter paper test:

About sixteen circular discs having a diameter of 5 mm. and a thickness of 1 mm. are cut out from the molding material are laid on filter paper. The samples with the filter paper are stored in a heating cabinet at 70° to 200° C. The low molecular weight constituents of the molding material which exude are absorbed by the paper and thus color it. This test permits a rapid assessment as to the resistance of the molding material as regards separation of the components and consequently as regards resistance to ageing.

Another disadvantage of the molding materials known from Belgian patent specification No. 642,091, French patent specification 1,353,416 and British patent specification No. 969,169 is their resistance to low temperatures which is inadequate for many purposes. Thus for example a mixture of 70% by weight of bitumen having a penetration of 25 with 30 parts of a copolymer of 75 parts of ethylene and 25 parts of vinyl acetate, has a breaking point according to Fraass (DIN 1995) of —15° C. Although this is an improvement of about 12° C. over pure bitumen, it is often not enough.

We have found that molding materials containing:

(A) 30 to 99 parts by weight of bitumen having a penetration (according to DIN 1995) of from 1 to 210;
(B) 0.5 to 69.5 parts by weight of a copolymer of 30 to 97% by weight of ethylene and 70 to 3% by weight of a vinyl ester and/or an acrylic and/or methacrylic ester; and
(C) 0.5 to 30 parts by weight of polyisobutylene having a molecular weight of 1000 to 200,000;

the total of the parts by weight of components (A) to (C) being 100 parts by weight, having particularly good properties.

The new molding materials have excellent elastic properties. They also have improved homogeneity, improved resistance to ageing and improved resistance to low temperatures. There is practically no exudation of low molecular weight constituents from the new molding materials under normal conditions. The new molding materials are elastic even at low temperatures, for example at —40° C.

For example if films or sheeting of a molding material of 65 to 67.5 parts by weight of bitumen and 30 parts by weight of an ethylene copolymer be stored at 70° C. in a heating cabinet, a fall in the elongation at break of 120% can be established after storage for four weeks. On the contrary the elongation at break of films or sheeting of a similar molding material which additionally contains 2.5 to 5 parts by weight of polyisobutylene remains unchanged under the same storage conditions. In the case of the molding material of two components, low molecular weight constituents occur on the surface after a short time owing to the elevated temperature. In the case of the new molding material, no low molecular weight constituents appear during storage for one year in a dark room at normal temperature, and the new molding material containing 2.5 to 5 parts by weight of polyisobutylene exhibits no exudation in the filter paper test after storage at 80° C. for 180 hours. On the other hand, prior art molding material exhibits marked exudation after only twenty-four hours under the same conditions. In this case the filter paper is discolored dark brown after even this short time.

Bitumens which are suitable for the molding material according to the invention have a pentration (according to DIN 1995) of 1 to 210. It is advantageous to use a bitumen which is a high-vacuum or a blown bitumen, the high-vacuum bitumen having a penetration of from 5 to 11 and the blown bitumen a penetration of from 5 to 45.

Molding materials of a high vacuum bitumen and an ethylene copolymer, which contain 5 to 10 parts by weight of a polyisobutylene have the same mechanical properties as a molding material of bitumen (without additives), which has been distilled at atmospheric pressure, but is superior thereto in resistance to ageing. Molding materials which contain oily polyisobutylene are also still elastic at low temperatures.

Molding materials based on blown bitumen preferably contain 1 to 10% by weight of polyisobutylene.

Ethylene copolymers which are suitable for the molding materials may be prepared by conventional methods, for example by the high pressure polymerization method at pressures of more than 1000 atmospheres or by solution or emulsion polymerization methods in aqueous dispersion at pressures of from about 100 to 400 atmospheres from ethylene and vinyl esters and/or acrylic and/or methacrylic esters. Vinyl acetate and vinyl propionate are particularly suitable vinyl esters for the copolymers. Examples of suitable acrylic and methacrylic esters are acrylic and methacrylic alkyl esters, particularly acrylic esters which are derived from alkyl alcohols having one to ten carbon atoms. Examples of individual esters are: methyl, propyl, isobutyl, cyclohexyl and 2-ethylhexyl acrylates and methacrylates. The ethylene copolymers suitable for the molding materials may contain units of one or more vinyl ester and/or one or more acrylic and/or methacrylic ester. Mixtures of ethylene copolymers of the said type may also be used for the production of the molding materials.

Copolymers of ethylene with vinyl esters and/or acrylic and/or methacrylic alkyl esters which have been prepared at pressures of more than 1000 atmospheres (i.e. in general at pressures between 1000 and 3000 atmospheres) are preferred for the molding materials. Molding materials which contain coplymers of 50 to 97% by weight of ethylene and 50 to 3% by weight of vinyl acetate or 50 to 3% by weight of acrylic alkyl esters are of special interest.

Oily and elastomeric polyisobutylenes whose molecular weights are from 1000 to 200,000 are suitable for the molding materials. Oily polyisobutylene has a molecular weight of 1000 to about 5000, elastomeric polyisobutylene from about 5000 to 200,000.

Molding materials according to this invention and having elastomeric properties generally contain 30 to 80 parts by weight of bitumen, 19.5 to 69.5 parts by weight of ethylene copolymers and 0.5 to 30 parts by weight of polyisobutylene.

Molding materials containing less than 20 parts by weight of ethylene copolymer and polyisobutylene exhibit a slight elastomeric behavior. The plasticity range (range of temperature between the softening point and the breaking point) is however always much wider than in the case of bitumens which do not contain these additions.

The new molding materials may be prepared by a conventional method by mixing bitumen, ethylene copolymer and polyisobutylene in conventional mixing means, such as agitators, kneaders, extruders and mixing rolls. They may be applied, for example spread or trowelled on, in the molten condition in practically any thickness. It is advantageous to heat the surface of the article to be coated to a temperature about equivalent to the temperature of the hot molding material. It may also be advantageous to provide the surface to be coated first with a priming coat, for example of a bitumen emulsion. Moreover the molding materials may readily be processed into films, sheeting and boards and may be used for lining containers and coating pipes. The molding materials may also be used for making floor coverings, for example by pouring, and joints or cracks in buildings or roadways may be sealed therewith. The molding materials may also be processed in conventional ways, for example with extruders, injection molding machines and presses, into moldings, such as pipes, hoses, sections, packings, parts of casings, and containers. Moldings prepared from the molding materials may readily be joined together by moistening the surface with solvents or by superficial fusion.

The molding materials are also suitable for the production of cast articles, for protecting articles against corrosion by dipping in the molten material, and for the production of elastic protecting bands for pipelines. The molding materials may also be used in finely divided form for the production of coatings by the whirl sintering method or the flame spraying method.

Conventional fillers, such as wood flour, carbon black, diatomaceous earth, kaolin, quartz powder, stone chippings, sand, glass fibers and mineral wool, as well as rubber powder, wool felt, jute or synthetic fibers, may also be added to the molding materials; mechanical strength and elastic behavior of the molding materials may be further improved in this way. Molding materials which contain mineral fillers having a particle size of 0.01 to 0.09 mm., such as stone powder, may be worked up particularly well into moldings and handled particularly readily in granulated form. The proportion of these particulate fillers may in general be varied within wide limits and in general it is from about 5 to about 70% by weight on the whole molding material.

Molding materials which contain not only particulate mineral fillers of the said type but also mineral fillers having particle sizes of more than 0.09 up to 20 mm., such as sand and stone chippings, may be used with special advantage for the production of cast or rolled pipes and also road surfaces and floor slabs. These molding materials in general contain 6 to 26% by weight (on the whole molding material) of mineral fillers having a particle size of more than 0.09 up to 20 mm.

Molding materials which contain fibrous fillers, such as glass fibers, asbestos, mineral wool, wool felt, jute and/or synthetic fibers, with or without mineral fillers of the said type, have a particularly high stability under load. The proportion of fibrous fillers in such molding materials is in general from 5 to 80% by weight on the whole molding material.

The invention is illustrated by the following examples in which parts and percentages are by weight.

Example 1

70 parts of bitumen (having a penetration of 45 according to DIN 1995 and a softening point of about 60° C., measured by the ring and ball method), 25 parts of a copolymer (having a melt index of 11.5 and prepared by a conventional method at a pressure of more than 1000 atmospheres gauge from 79% of ethylene and 21% of vinyl acetate) and 5 parts of polyisobutylene (having a mean molecular weight of 50,000) are mixed in a planetary agitator. A homogeneous molding material is rapidly obtained; it has an elongation at break of 380% according to DIN 53,455. Adhesion to steel surfaces which have been cleaned by sandblasting is 10 kg./sq. cm. in the case of cold sheet steel. If the sheet steel be preheated to about 190° C., the adhesion rises to 17 kg./sq. cm. After the molding material has been stored for four weeks at 70° C., there is no fall in the tensile strength and elongation at break. The surface of the molding material remains dry and retains its original color.

Molding materials of 70 parts of the same bitumen and 30 parts of the same ethylene copolymer, but without the addition of polyisobutylene, when applied to sheet steel surfaces which have been preheated, have an adhesion of only 14 kg./sq. cm. and their elongation at break falls by 100% after they have been stored for three weeks at 70° C. Their surface becomes smeary by exudation of constituents when they are stored.

Example 2

50 parts of high-vacuum bitumen (having a penetration of 2 to 6 and a softening point of about 100° C.) is mixed in a planetary agitator at 160° C. with 8 parts of polyisobutylene (having a mean molecular weight of 10,000). After having been mixed for about five minutes, 42 parts of a copolymer (of 87.6% of ethylene and 22.4% of vinyl acetate and having a melt index of 50) is added. The temperature is raised to about 210° C. A molding material is obtained which has outstanding resistance to ageing. After having been stored for thirty days at 70° C. and weathered for 180 days, there is no deterioration. The elongation at break still has the original value of about 380% after these tests. The penetration and the good distribution also does not change.

Example 3

70 parts of blown bitumen (having a penetration of 25 and a softening point of 85° C.) is mixed in a planetary agitator at 220° C. with 5 parts of polyisobutylene (having a molecular weight of 10,000) and 25 parts of a copolymer (of 80% of ethylene and 20% of vinyl acetate and having a melt index of 22). A homogeneous mixture is obtained which has an elongation at break of 350% and an adhesion on preheated sheet steel of 12 kg./sq. cm.. After storage for one year in a dark room at 25° C., no change can be detected in the molding material.

Example 4

50 parts of bitumen (having a penetration of 80 and a softening point of about 46° C.) is mixed with 42 parts of a copolymer (of 79% of ethylene and 21% of ethyl acrylate, which has been prepared at a pressure of more than 1000 atmospheres gauge and has a melt index of 18.7) and with 8 parts of polyisobutylene (having a molecular weight of 15,000) in a paddle kneader at 180° C. A homogeneous composition is rapidly obtained which has an elongation at break of 180%. Its adhesion to preheated sheet steel is 14 kg./sq. cm.

A molding material from the same amount of the same bitumen and the same amount of the same ethylene copolymer but without the addition of polyisobutylene has an elongation at break of only 140% and an adhesion to preheated sheet steel of 13 kg./sq. cm..

Examples 5 to 7

95 parts of bitumen (having a softening point of 62° C., a penetration of 25.5 and a breaking point, according to Fraass, of −2.5° C.) is mixed in a planetary agitator at 155° C. with 2.5 parts of a copolymer of:
(A) 88, (B) 75 or (C) 74.8% of ethylene and (A) 12, (B) 25 or (C) 25.2 parts of vinyl acetate (the said copolymers having a melt index of (A) 4, (B) 25 or (C) 40), and 2.5 parts of polyisobutylene (having a molecular weight of 50,000). The softening points, breaking points and penetrations of the resulting molding materials are given in the following Table 1:

TABLE 1

|  | Example | | |
|---|---|---|---|
|  | 5 | 6 | 7 |
| Copolymer | A | B | C |
| Softening point (ring and ball), °C | 80.1 | 75 | 70.1 |
| Breaking point (Fraass), °C | −10.4 | −22 | −15.2 |
| Penetration | 15.2 | 18.4 | 17.1 |

Molding materials of 95 parts of the same bitumen and 5 parts of the same ethylene copolymers (A), (B) or (C) but without the addition of polyisobutylene have the softening points, breaking points and penetrations given in the following Table 2:

TABLE 2

| Copolymer | A | B | C |
|---|---|---|---|
| Softening point (ring and ball), °C | 83.3 | 77 | 72.7 |
| Breaking point (Fraass), °C | −3.8 | −8.5 | −4 |
| Penetration | 14.5 | 17.3 | 15 |

Comparison of Table 1 with Table 2 shows that the molding materials according to the invention have a much greater plasticity range than the prior art molding materials.

Example 8

70 parts of bitumen (having a penetration of 45 and a softening point of about 55° C.) is mixed in a continuous kneader at 140° C. with 10 parts of a copolymer (of 75% of ethylene and 25% of vinyl-acetate) and 20 parts of polyisobutylene (having a molecular weight of 15,000). A homogeneous molding material is obtained very quickly which is particularly suitable as a joint sealing compound for motorways, runways and buildings. The molding material has a breaking point (according to Fraass) of −56° C., a softening point (ring and ball) of 99° C. and a penetration of 31. A falling ball test according to Swiss standard SNV 71,625 at −20° C. is discontinued at a height of fall of the ball of 7 metres without the ball exhibiting damage.

We claim:
1. A molding material containing:
 (A) 30 to 99 parts by weight of bitumen having a penetration of from 1 to 210;
 (B) 0.5 to 69.5 parts by weight of a copolymer of 30 to 97% by weight of ethylene and 70 to 3% by weight of a vinyl ester and/or an acrylic ester and/or methacrylic ester; and
 (C) 0.5 to 30 parts by weight of a polyisobutylene having a molecular weight of 1000 to 200,000,
the total of the parts by weight of the components (A) to (C) being 100 parts by weight.
2. A molding material as claimed in claim 1 which also contains a filler.
3. A molding material as claimed in claim 1 in which component (B) is copolymer of 50 to 97% by weight of ethylene and 50 to 3% by weight of vinyl acetate.
4. A molding material as claimed in claim 1 in which component (B) is a copolymer of 50 to 97% by weight of ethylene and 50 to 3% by weight of an acrylic alkyl ester.
5. A molding material as claimed in claim 1 wherein the bitumen is a high-vacuum bitumen having a penetration of from 5 to 11.
6. A molding material as claimed in claim 1 wherein the bitumen is a blown bitumen having a penetration of from 5 to 45.

References Cited

UNITED STATES PATENTS 3,321,427    4/1967    Tyran _____ 260—28.5

ALLAN LIEBERMAN, *Primary Examiner.*

H. S. KAPLAN, *Assistant Examiner.*